(12) United States Patent
Deng et al.

(10) Patent No.: US 11,323,199 B2
(45) Date of Patent: May 3, 2022

(54) OPTICAL TRANSMISSION SYSTEM AND OPTICAL POWER CONTROL METHOD

(71) Applicant: HUAWEI TECHNOLOGIES CO., LTD., Shenzhen (CN)

(72) Inventors: Binlin Deng, Shanghai (CN); Yang Li, Wuhan (CN); Hui Yan, Wuhan (CN); Yuanwu Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 80 days.

(21) Appl. No.: 16/589,547

(22) Filed: Oct. 1, 2019

(65) Prior Publication Data
US 2020/0044766 A1 Feb. 6, 2020

Related U.S. Application Data

(63) Continuation of application No. PCT/CN2017/080027, filed on Apr. 11, 2017.

(51) Int. Cl.
*H04J 14/02* (2006.01)
*H04B 10/564* (2013.01)

(52) U.S. Cl.
CPC ........ *H04J 14/0221* (2013.01); *H04B 10/564* (2013.01)

(58) Field of Classification Search
CPC .................. H04J 14/0221; H04B 10/564
See application file for complete search history.

(56) References Cited

U.S. PATENT DOCUMENTS

| | | | |
|---|---|---|---|
| 6,885,499 B1* | 4/2005 | Hoshida | H04B 10/2942 359/337 |
| 8,433,200 B2* | 4/2013 | Arahira | H04L 9/0855 398/142 |
| 8,818,190 B2* | 8/2014 | Hayashi | H04B 10/07955 398/34 |
| 2004/0109227 A1 | 6/2004 | Shin et al. | |
| 2006/0044646 A1 | 3/2006 | Shimizu | |
| 2008/0226291 A1 | 9/2008 | Onaka | |

(Continued)

FOREIGN PATENT DOCUMENTS

| | | |
|---|---|---|
| CN | 1482757 A | 3/2004 |
| CN | 1506740 A | 6/2004 |

(Continued)

*Primary Examiner* — Mina M Shalaby
(74) *Attorney, Agent, or Firm* — Rimon PC

(57) ABSTRACT

This application provides a sending device, a receiving device, an optical transmission system, and an optical power control method. The sending device includes a multiplexing unit and an optical power adjustment unit. The multiplexing unit is configured to send at least two communication optical waves to a fiber channel, and is further configured to send or receive at least two detection optical waves through the fiber channel. The optical power adjustment unit is configured to: obtain a power control instruction, where the power control instruction is generated according to power change information between the at least two detection optical waves. The optical power adjustment unit is further configured to perform optical power amplification and/or attenuation on at least one communication optical wave in the at least two communication optical waves according to the power control instruction.

10 Claims, 9 Drawing Sheets

(56) References Cited

U.S. PATENT DOCUMENTS

2014/0286635 A1   9/2014  Kaneko et al.
2019/0349113 A1*  11/2019 Komiya ............... H04J 14/0221

FOREIGN PATENT DOCUMENTS

| CN | 1741325 A | 3/2006 |
| CN | 101273557 A | 9/2008 |
| CN | 102571213 A | 7/2012 |
| EP | 0994583 A1 | 4/2000 |
| EP | 1137129 A2 | 9/2001 |
| EP | 1427118 A1 | 6/2004 |
| WO | 2009144454 A | 12/2009 |
| WO | 2009144454 A1 | 12/2009 |

* cited by examiner

OPTICAL TRANSMISSION SYSTEM AND OPTICAL POWER CONTROL METHOD

CROSS-REFERENCE TO RELATED APPLICATIONS

This application is a continuation of International Application No. PCT/CN2017/080027, filed on Apr. 11, 2017. The disclosure of the aforementioned application is hereby incorporated by reference in its entirety.

TECHNICAL FIELD

This application relates to the field of optical communications technologies, and in particular, to a sending device, a receiving device, an optical transmission system, and an optical power control method.

BACKGROUND

With a sharp increase in demand for optical transmission communication capacity, wavelength division multiplexing technology becomes a main transmission technology in optical transmission systems. The wavelength division multiplexing technology is a technology that simultaneously transmits multiple communication optical waves of different wavelengths in one optical fiber. That is, one fiber may include multiple transmission channels, and each transmission channel is used to transmit a communication optical wave of a predetermined wavelength.

Generally, communication optical waves transmitted in an optical fiber fall within a C band range (a wavelength range is 1530-1565 nm). To increase the bandwidth of a transmission channel, multiple communication optical waves within an L band range (a wavelength range is 1570-1605 nm) may also be simultaneously transmitted in the fiber. As shown in FIG. 1, multiple communication optical waves within the C band range and the L band range are simultaneously transmitted in the same fiber. An optical transmission system usually includes several basic structures of spans, and FIG. 1 shows a typical basic structure of a span. The basic structure includes: an erbium-doped fiber amplifier of C band (C_EDFA) 11, an erbium-doped fiber amplifier of L band (L_EDFA) 12, a first variable optical attenuator (VOA) 13, a second VOA 14, a first fiber interface unit (FIU) 15, and a second FIU 16. An optical power of a communication optical wave corresponding to the C band is correspondingly amplified by using the C_EDFA 11, and/or an optical power of a communication optical wave corresponding to the C band is correspondingly attenuated by using the first VOA 13. An optical power of a communication optical wave corresponding to the L band is correspondingly amplified by using the L_EDFA 12, and/or an optical power of a communication optical wave corresponding to the L band is correspondingly attenuated by using the second VOA 14. Subsequently, at a transmit end, the changed communication optical waves of different wavelengths are combined (multiplexed) by using the first FIU 15, and are coupled to the same fiber of an optical cable line for transmission. At a receive end, a combined communication optical wave is split (demultiplexed) by using the second FIU 16 to obtain the communication optical waves of various wavelengths, and the obtained communication optical waves of various wavelengths are sent to different next stations.

As the wavelength range of communication optical waves simultaneously transmitted in one fiber increases, a non-linear effect in the fiber becomes an important factor affecting performance of a multi-wavelength optical transmission system. The non-linear effect includes a stimulated Raman scattering (SRS) effect. Raman scattering may be considered as modulation performed on a photon by a molecule in a medium. That is, a relative motion between molecules causes time-dependent periodic modulation of a molecular electric dipole moment, further causing a scattering function to be performed on the photon. When lit by low-intensity ordinary light, the medium has relatively small Raman scattering, and the scattering effect is extremely weak. However, when laser light is used as an incidence source, the Raman scattering process of the medium has characteristics of stimulated emission, and is referred to as an SRS effect. A basic process of stimulated Raman scattering is as follows: first the incidence light enters a medium, then a photon is absorbed by the medium, and as a result, a medium molecule is stimulated from a ground energy level E1 to a high energy level $E3=E1+h_w$, where $h=h/2\pi$, and $w_p$ is an angular frequency of the incidence light. The high energy level is an unstable state, and the photon rapidly jumps to a lower energy level E2 of a metastable state, and in the process a scattering photon is emitted. An angular frequency of the scattering photon is $w_s$, which is smaller than $w_p$. When the energy level E2 of the metastable state falls back to the ground state, an optical phonon of energy $h\Omega$ is produced. An angular frequency of the optical phonon is determined by a resonance frequency of the molecule. Stimulated Raman scattering occurs only when the intensity of the incidence light exceeds a threshold, and this scattering light has characteristics of high directivity, high intensity, and high coherence. In an example in which the multi-wavelength optical transmission system supports both the C band and the L band, if a frequency difference between the C band and the L band is within a Raman gain spectrum, the SRS effect transfers energy of the C band to the L band. Therefore, the optical power of a communication optical wave of the C band decreases, and the optical power of a communication optical wave of the L band increases, causing a non-linear effect.

Therefore, it can be learned from FIG. 1 that, when a communication optical wave corresponding to the C band and a communication optical wave corresponding to the L band are transmitted together, an SRS effect may cause changes to optical powers of the communication optical waves of the two different bands. For example, the optical power of the communication optical wave corresponding to the C band decreases, and the optical power of the communication optical wave corresponding to the L band increases. Current optical transmission system cannot reduce or eliminate the impact caused by the SRS effect on the optical powers of the different bands.

SUMMARY

To resolve the aforementioned problem, this application provides a sending device, a receiving device, an optical transmission system, and an optical power control method. The technical solutions are as follows:

According to a first aspect, an embodiment of this application provides a sending device in an optical transmission system, and the sending device includes: a multiplexing unit and an optical power adjustment unit;

the multiplexing unit is configured to send at least two communication optical waves to a fiber channel, where wavelengths of the at least two communication optical waves belong to an operating band;

the multiplexing unit is further configured to send or receive at least two detection optical waves through the fiber channel, where the at least two detection optical waves include at least one first detection optical wave whose wavelength is less than a minimum wavelength of the operating band, and at least one second detection optical wave whose wavelength is greater than a maximum wavelength of the operating band; and the optical power adjustment unit is configured to: obtain a power control instruction, where the power control instruction is generated according to power change information between the at least two detection optical waves; and perform optical power amplification and/or attenuation on at least one communication optical wave in the at least two communication optical waves according to the power control instruction.

In this implementation, the at least two communication optical waves are sent to the fiber channel by using the multiplexing unit, and the at least two out-of-band detection optical waves are simultaneously transmitted through the fiber channel, so that the optical transmission system can generate the power control instruction according to the power change information between the at least two detection optical waves, and then perform optical power amplification and/or attenuation on at least one communication optical wave in the at least two communication optical waves according to the obtained power control instruction. That an optical power changes after the communication optical wave is transmitted may be resulted from two causes. A first possible cause is that the SRS effect affects the optical power when the at least two communication optical waves are normally transmitted (there is no wave drop or wave addition in transmission). A second possible cause is that the SRS effect changes when there is wave drop or wave addition in transmission of at least one communication optical wave in the at least two communication optical waves, and a changed SRS effect causes fluctuation of the optical power. For the optical power change resulted from the two possible causes, the optical transmission system can obtain the power change information by analyzing a power change degree between the at least two detection optical waves, and the power change information not only can represent an overall change degree of at least two optical powers of the at least two transmitted detection optical waves, but also can indirectly reflect an overall change degree of at least two optical powers of the at least two transmitted communication optical waves. The optical power adjustment unit dynamically adjusts the optical power of the communication optical wave according to the power control instruction, so as to reduce or eliminate impact caused by the changed SRS effect on the optical power fluctuation, increase a transmission distance of the optical system, and improve stability of the entire optical transmission system.

In a possible implementation, the sending device further includes a detection wave transmit end connected to the multiplexing unit;

the detection wave transmit end is configured to input the at least two detection optical waves to the multiplexing unit, where a transmission direction of the detection optical wave is the same as a transmission direction of the communication optical wave; and the optical power adjustment unit is configured to receive the power control instruction from a receiving device, where the power control instruction is generated by the receiving device according to the power change information between the at least two detection optical waves.

In this implementation, the at least two detection optical waves are input to the multiplexing unit by using the detection wave transmit end, and correspondingly, the multiplexing unit sends the at least two detection optical waves to a demultiplexing unit according to the received at least two detection optical waves, so that the transmission direction of the detection optical wave is the same as the transmission direction of the communication optical wave, and a "feedback→control" mechanism of the optical transmission system is forwardly set.

In a possible implementation, the sending device further includes: a detection wave receive end connected to the multiplexing unit, and a control unit connected to the detection wave receive end;

the detection wave receive end is configured to receive the at least two detection optical waves from the multiplexing unit, where a transmission direction of the detection optical wave is opposite to a transmission direction of the communication optical wave;

the control unit is configured to: after the detection wave receive end receives the at least two detection optical waves, generate the power control instruction according to the power change information between the at least two detection optical waves; and the optical power adjustment unit is configured to receive the power control instruction from the control unit.

In this implementation, the at least two detection optical waves are received from the multiplexing unit by using the detection wave receive end, and correspondingly, a demultiplexing unit sends the at least two detection optical waves to the multiplexing unit, so that the transmission direction of the detection optical wave is opposite to the transmission direction of the communication optical wave, and a "feedback→control" mechanism of the optical transmission system is backwardly set.

In a possible implementation, the at least two detection optical waves include m detection optical waves, and m is a positive integer greater than 1; and the control unit is configured to:

determine m power change values of the m detection optical waves according to the received m detection optical waves, where each power change value is used to indicate an optical power change degree of a single transmitted detection optical wave;

determine the power change information according to the m power change values, where the power change information is used to indicate an overall change degree of m optical powers of the m transmitted detection optical waves;

determine an adjustment coefficient corresponding to the power change information according to a preset correspondence, where the preset correspondence includes a correspondence between the power change information and the adjustment coefficient, and the adjustment coefficient includes an amplification coefficient and/or an attenuation coefficient corresponding to the at least one communication optical wave; and generate the power control instruction carrying the adjustment coefficient.

In this implementation, the control unit determines the m power change values of the m detection optical waves according to the received m detection optical waves, determines the power change information according to the m power change values, determines the adjustment coefficient corresponding to the power change information according to the preset correspondence, and generates the power control instruction carrying the adjustment coefficient; the control unit determines the adjustment coefficient corresponding to the power change information according to the preset correspondence, that is, obtains the adjustment coefficient by looking up a table or through calculation by using a simulation formula, so that the optical transmission system can accurately and dynamically adjust the optical power by using the "feedback→control" mechanism.

In a possible implementation, a quantity of first detection optical waves is equal to a quantity of second detection optical waves.

In this implementation, the quantity of first detection optical waves is equal to the quantity of second detection optical waves, so that the determined power change information between the at least two detection optical waves can more accurately reflect the overall change degree of the at least two optical powers of the at least two transmitted communication optical waves.

According to a second aspect, an embodiment of this application provides a receiving device, and the receiving device includes a demultiplexing unit;

the demultiplexing unit is configured to receive at least two communication optical waves transmitted through a fiber channel, where wavelengths of the at least two communication optical waves belong to an operating band; and the demultiplexing unit is further configured to: receive or send at least two detection optical waves through the fiber channel, where the at least two detection optical waves include at least one first detection optical wave whose wavelength is less than a minimum wavelength of the operating band, and at least one second detection optical wave whose wavelength is greater than a maximum wavelength of the operating band where a power control instruction is generated according to power change information between the at least two detection optical waves; and perform optical power amplification and/or attenuation on at least one communication optical wave in the at least two communication optical waves according to the power control instruction.

In a possible implementation, the receiving device further includes: a detection wave receive end connected to the demultiplexing unit, and a control unit connected to the detection wave receive end;

the detection wave receive end is configured to receive the at least two detection optical waves from the demultiplexing unit, where a transmission direction of the detection optical wave is the same as a transmission direction of the communication optical wave; and the control unit is configured to: after the detection wave receive end receives the at least two detection optical waves, generate the power control instruction according to the power change information between the at least two detection optical waves, and send the power control instruction to the sending device, so that the sending device receives the power control instruction from the control unit.

In a possible implementation, the at least two detection optical waves include m detection optical waves, and m is a positive integer greater than 1; and the control unit is configured to:

determine m power change values of the m detection optical waves according to the received m detection optical waves, where each power change value is used to indicate an optical power change degree of a single detection optical wave transmitted through the fiber channel;

determine the power change information according to the m power change values, where the power change information is used to indicate an overall change degree of m optical powers of the m detection optical waves transmitted through the fiber channel;

determine an adjustment coefficient corresponding to the power change information according to a preset correspondence, where the preset correspondence includes a correspondence between the power change information and the adjustment coefficient, and the adjustment coefficient includes an amplification coefficient and/or an attenuation coefficient corresponding to the at least one communication optical wave; and generate the power control instruction carrying the adjustment coefficient.

In a possible implementation, the receiving device further includes a detection wave transmit end connected to the demultiplexing unit; and the detection wave transmit end is configured to input the at least two detection optical waves to the demultiplexing unit, where a transmission direction of the detection optical wave is opposite to a transmission direction of the communication optical wave, so that the sending device generates the power control instruction according to the power change information between the at least two detection optical waves.

In a possible implementation, a quantity of first detection optical waves is equal to a quantity of second detection optical waves.

According to a third aspect, an embodiment of this application provides an optical transmission system, and the system includes: a fiber channel, and a sending device and a receiving device that are connected to the fiber channel;

the sending device includes the sending device provided in the first aspect and any possible implementation of the first aspect; and the receiving device includes the receiving device provided in the second aspect and any possible implementation of the second aspect.

According to a fourth aspect, an embodiment of this application provides an optical power control method, and the method includes:

sending at least two communication optical waves to a fiber channel, where wavelengths of the at least two communication optical waves belong to an operating band;

sending or receiving at least two detection optical waves through the fiber channel, where the at least two detection optical waves include at least one first detection optical wave whose wavelength is less than a minimum wavelength of the operating band, and at least one second detection optical wave whose wavelength is greater than a maximum wavelength of the operating band;

obtaining a power control instruction, where the power control instruction is generated according to power change information between the at least two detection optical waves; and performing optical power amplification and/or attenuation on at least one communication optical wave in the at least two communication optical waves according to the power control instruction.

In a possible implementation, when a transmission direction of the detection optical wave is the same as a transmission direction of the communication optical wave, the obtaining of a power control instruction includes:

after sending the at least two detection optical waves to a receiving device, receiving the power control instruction from the receiving device, where the power control instruction is generated by the receiving device according to the power change information between the at least two detection optical waves.

In a possible implementation, when a transmission direction of the detection optical wave is opposite to a transmission direction of the communication optical wave, the obtaining of a power control instruction includes:

after receiving the at least two detection optical waves sent by a receiving device, generating the power control instruction according to the power change information between the at least two detection optical waves.

In a possible implementation, the at least two detection optical waves include m detection optical waves, and m is a positive integer greater than 1; and before the generating of the power control instruction according to the power change information between the at least two detection optical waves, the method further includes:

determining m power change values of the m detection optical waves according to the received m detection optical waves, where each power change value is used to indicate an optical power change degree of a single detection optical wave transmitted through the fiber channel; and determining the power change information according to the m power change values, where the power change information is used to indicate an overall change degree of m optical powers of the m detection optical waves transmitted through the fiber channel; and the generating of the power control instruction according to the power change information between the at least two detection optical waves includes:

determining an adjustment coefficient corresponding to the power change information according to a preset correspondence, where the preset correspondence includes a correspondence between the power change information and the adjustment coefficient, and the adjustment coefficient includes an amplification coefficient and/or an attenuation coefficient corresponding to the at least one communication optical wave; and generating the power control instruction carrying the adjustment coefficient.

In a possible implementation, a quantity of first detection optical waves is equal to a quantity of second detection optical waves.

According to a fifth aspect, an embodiment of this application provides an optical power control method, and the method includes:

receiving at least two communication optical waves transmitted through a fiber channel, where wavelengths of the at least two communication optical waves belong to an operating band;

receiving or sending at least two detection optical waves through the fiber channel, where the at least two detection optical waves include at least one first detection optical wave whose wavelength is less than a minimum wavelength of the operating band, and at least one second detection optical wave whose wavelength is greater than a maximum wavelength of the operating band, where a power control instruction to be obtained by a sending device is generated according to power change information between the at least two detection optical waves; and performing optical power amplification and/or attenuation on at least one communication optical wave in the at least two communication optical waves according to the power control instruction.

In a possible implementation, when a transmission direction of the detection optical wave is the same as a transmission direction of the communication optical wave, the method further includes:

after receiving the at least two detection optical waves sent by the sending device, generating the power control instruction according to the power change information between the at least two detection optical waves, and sending the power control instruction to the sending device, so that the sending device receives the power control instruction from a control unit.

In a possible implementation, the at least two detection optical waves include m detection optical waves, and m is a positive integer greater than 1; and before the generating of the power control instruction according to the power change information between the at least two detection optical waves, the method further includes:

determining m power change values of the m detection optical waves according to the received m detection optical waves, where each power change value is used to indicate an optical power change degree of a single detection optical wave transmitted through the fiber channel; and determining the power change information according to the m power change values, where the power change information is used to indicate an overall change degree of m optical powers of the m detection optical waves transmitted through the fiber channel; and the generating of the power control instruction according to the power change information between the at least two detection optical waves includes:

determining an adjustment coefficient corresponding to the power change information according to a preset correspondence, where the preset correspondence includes a correspondence between the power change information and the adjustment coefficient, and the adjustment coefficient includes an amplification coefficient and/or an attenuation coefficient corresponding to the at least one communication optical wave; and generating the power control instruction carrying the adjustment coefficient.

In a possible implementation, when a transmission direction of the detection optical wave is opposite to a transmission direction of the communication optical wave, the method further includes:

sending the at least two detection optical waves to the sending device, so that the sending device generates the power control instruction according to the power change information between the at least two detection optical waves.

In a possible implementation, a quantity of first detection optical waves is equal to a quantity of second detection optical waves.

DESCRIPTION OF EMBODIMENTS

To make the objectives, technical solutions, and advantages of this application clearer, the following further describes the implementations of this application in detail with reference to the accompanying drawings.

An optical transmission system usually includes several basic structures of spans. FIG. 2 to FIG. 7 show an example of one basic structure of span.

Figure 1:
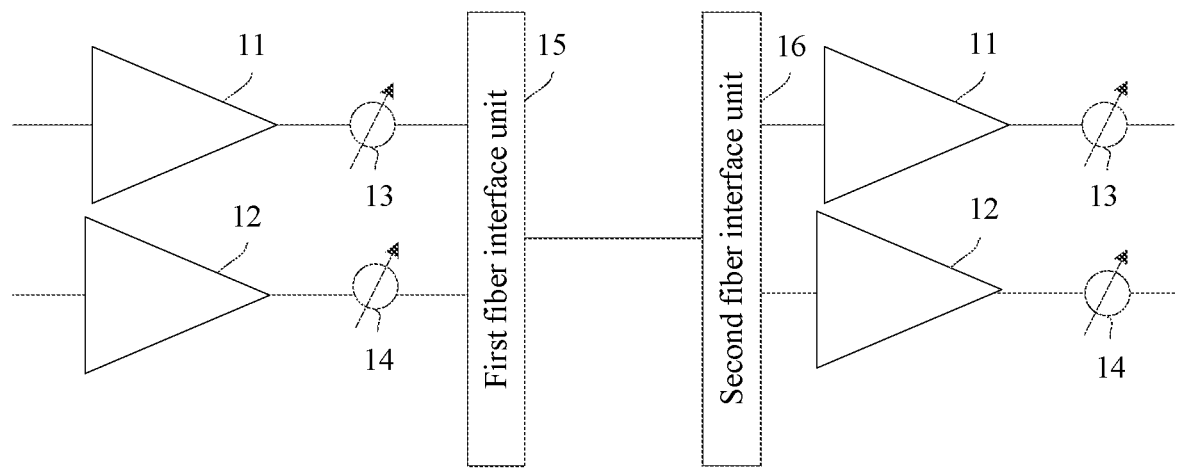
FIG. 1 is a schematic diagram of a typical basic structure of span in an optical transmission system that simultaneously transmits multiple communication optical waves in a C band and an L band in a related technology.
Figure 2:
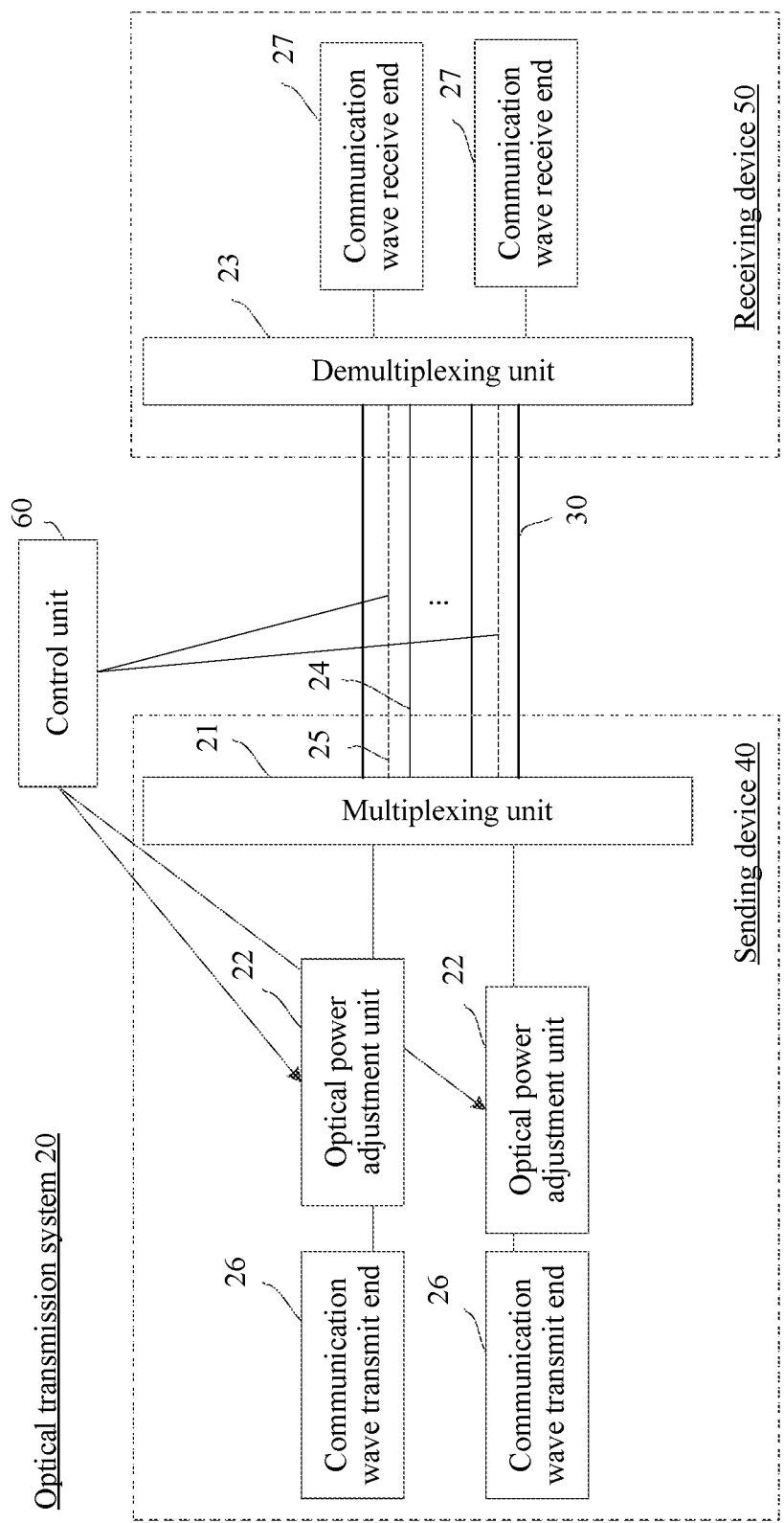
FIG. 2 is a schematic diagram of an optical transmission system according to an illustrative embodiment of this application.

Referring to FIG. 2, FIG. 2 is a schematic diagram of an optical transmission system according to an illustrative embodiment of this application. The optical transmission system 20 includes: a fiber channel 30, a sending device 40 and a receiving device 50 that are connected to the fiber channel 30, and a control unit 60. The sending device 40 includes a multiplexing unit 21 and an optical power adjustment unit 22. The receiving device 50 includes a demultiplexing unit 23.

The multiplexing unit 21 sends at least two communication optical waves 24 to the fiber channel 30, and wavelengths of the at least two communication optical waves 24 belong to an operating band. Correspondingly, the demultiplexing unit 23 receives the at least two communication optical waves 24 through the fiber channel 30.

Optionally, the sending device 40 further includes at least two communication wave transmit ends 26 connected to the multiplexing unit 21. The receiving device 50 further includes at least two communication wave receive ends 27 connected to the demultiplexing unit 23. When the communication wave transmit ends 26 send the at least two communication optical waves to the multiplexing unit 21, the multiplexing unit 21 combines (multiplexes) the at least two communication optical waves, and transmits the at least two communication optical waves to the demultiplexing unit 23 through the fiber channel 30. The demultiplexing unit 23 demultiplexes and outputs the received at least two communication optical waves to the communication wave receive ends 27. Correspondingly, the communication wave receive ends 27 receive the at least two communication optical waves.

Optionally, the multiplexing unit 21 includes n first interfaces and one second interface, and the demultiplexing unit 23 includes n first interfaces and one second interface, where n is a positive integer.

For example, when the at least two communication optical waves 24 are 80 communication optical waves 24 of different wavelengths, the 80 communication optical waves 24 of different wavelengths are input to the multiplexing unit 21 by using 80 corresponding first interfaces, that is, one communication optical wave 24 of one wavelength corresponds to one first interface in the multiplexing unit 21. Correspondingly, the multiplexing unit 21 multiplexes the 80 communication optical waves 24, and sends the 80 communication optical waves 24 to the demultiplexing unit 23 by using one second interface. The demultiplexing unit 23 receives the 80 communication optical waves 24 by using one second interface and performs demultiplexing, and outputs the 80 communication optical waves 24 by using the 80 first interfaces, that is, one first interface in the demultiplexing unit 23 corresponds to one communication optical wave 24 of one wavelength.

For another example, when the at least two communication optical waves 24 are 80 communication optical waves 24 of different wavelengths, 40 communication optical waves 24 of different wavelengths belong to a C band, and the other 40 communication optical waves 24 of different wavelengths belong to an L band, the communication optical waves 24 of the C band and the communication optical waves 24 of the L band are input to the multiplexing unit 21 by using two corresponding first interfaces, that is, the communication optical waves 24 belonging to a same band are corresponding to one first interface in the multiplexing unit 21. Correspondingly, the multiplexing unit 21 combines (multiplexes) the communication optical waves 24 of the C band and the communication optical waves 24 of the L band, and sends the communication optical waves 24 to the demultiplexing unit 23 by using one second interface. The demultiplexing unit 23 receives the communication optical waves 24 of the C band and the communication optical waves 24 of the L band by using one second interface and performs demultiplexing, and outputs the communication optical waves 24 of the C band and the communication optical waves 24 of the L band by using two first interfaces, that is, one first interface in the demultiplexing unit 23 corresponds to the communication optical waves 24 belonging to the same band.

It should be noted that, the multiplexing unit and the demultiplexing unit are basically same components, and each include n first interfaces and one second interface. When the n first interfaces of the multiplexing unit are input ends, and the one second interface is an output end, the multiplexing unit is configured to multiplex the optical waves passing through the multiplexing unit. When the n first interfaces of the multiplexing unit are output ends, and the one second interface is an input end, the multiplexing unit is configured to demultiplex the optical waves passing through the multiplexing unit. Similarly, when the n first interfaces of the demultiplexing unit are input ends, and the one second interface is an output end, the demultiplexing unit is configured to multiplex the optical waves passing through the demultiplexing unit. When the n first interfaces of the demultiplexing unit are output ends, and the one second interface is an input end, the demultiplexing unit is configured to demultiplex the optical waves passing through the demultiplexing unit.

The multiplexing unit (or the demultiplexing unit) can multiplex or demultiplex, according to a specific configuration, the optical waves that pass through, and "the multiplexing unit" and "the demultiplexing unit" do not impose a function limitation.

Optionally, the multiplexing unit is a first FIU, and the demultiplexing unit is a second FIU.

Optionally, the operating band includes two different operating bands. For example, the operating band includes any one of the C band, the L band, an enhanced C band, or an enhanced L band. The enhanced C band includes the C band and an extended C band outside the C band, and the enhanced L band includes the L band and an extended L band outside the L band. Optionally, the at least two communication optical waves 24 are two communication optical waves 24 of different wavelengths in the same operating band, or may be two communication optical waves 24 of different wavelengths in different operating bands.

For example, the multiplexing unit 21 sends 160 communication optical waves 24 of different wavelengths to the fiber channel 30. 80 communication optical waves 24 belong to the C band (C80 waves for short), and 80 communication optical waves 24 belong to the L band (L80 waves for short). For another example, the multiplexing unit 21 sends 90 communication optical waves 24 to the fiber channel 30. 80 communication optical waves 24 belong to the C band, and 10 communication optical waves 24 belong to the extended C band outside the C band.

Optionally, because an SRS effect exists between the at least two communication optical waves 24, the SRS effect causes the optical powers of the at least two communication optical waves 24 to affect each other.

The multiplexing unit 21 further sends or receives at least two detection optical waves 25 through the fiber channel 30, and the fiber channel 30 is configured to transmit the at least two detection optical waves 25.

Optionally, when the multiplexing unit 21 sends the at least two detection optical waves 25 through the fiber channel 30, the demultiplexing unit 23 receives the at least two detection optical waves 25 through the fiber channel 30. Alternatively, when the demultiplexing unit 23 sends the at least two detection optical waves 25 through the fiber channel 30, the multiplexing unit 21 receives the at least two detection optical waves 25 through the fiber channel 30.

The at least two detection optical waves 25 include at least one first detection optical wave whose wavelength is less than a minimum wavelength of the operating band, and at least one second detection optical wave whose wavelength is greater than a maximum wavelength of the operating band.

Optionally, the first detection optical wave may also be referred to as a first-type detection optical wave, and the first-type detection optical wave is a type of detection optical wave whose wavelength is less than the minimum wavelength of the operating band; the second detection optical wave may also be referred to as a second-type detection optical wave, and the second-type detection optical wave is a type of detection optical wave whose wavelength is greater than the maximum length of the operating band.

For example, the operating band is the C band and the L band. The wavelength range of the C band is 1530-1565 nm, and the wavelength range of the L band is 1570-1605 nm. Therefore, there is at least one first detection optical wave whose wavelength is less than 1530 nm, and there is at least one second detection optical wave whose wavelength is greater than 1605 nm.

Optionally, the quantity of first detection optical waves may be equal to or unequal to a quantity of second detection optical waves.

For example, when the quantity of detection optical waves 25 is two, there is one first detection optical wave and one second detection optical wave; when the quantity of detection optical waves 25 is three, there may be one first detection optical wave and two second detection optical waves, or there may be two first detection optical waves and one second detection optical wave; when the quantity of detection optical waves 25 is four, there may be two first detection optical waves and two second detection optical waves.

The control unit 60 generates a power control instruction according to the power change information between the at least two detection optical waves 25, and sends the power control instruction to the optical power adjustment unit 22. Correspondingly, the optical power adjustment unit 22 obtains the power control instruction.

Optionally, the control unit 60 is disposed in the sending device 40 or the receiving device 50. When the transmission direction of the detection optical wave 25 is the same as the transmission direction of the communication optical wave 24, the control unit 60 is disposed in the receiving device 50; when the transmission direction of the detection optical wave 25 is opposite to the transmission direction of the communication optical wave 24, the control unit 60 is disposed in the sending device 40. Optionally, the control unit 60 may further be disposed outside the sending device 40 or the receiving device 50.

Optionally, when the transmission direction of the detection optical wave 25 is the same as the transmission direction of the communication optical wave 24, a detection wave transmit end (not shown in FIG. 2) is further disposed in the sending device 40, a detection wave receive end (not shown in FIG. 2) is further disposed in the receiving device 50, and the control unit 60 obtains the power change information between at least two detection optical waves 25 from the receiving device 50. When the transmission direction of the detection optical wave 25 is opposite to the transmission direction of the communication optical wave 24, a detection wave receive end (not shown in FIG. 2) is further disposed in the sending device 40, a detection wave transmit end (not shown in FIG. 2) is further disposed in the receiving device 50, and the control unit 60 obtains the power change information between the at least two detection optical waves 25 from the sending device 40.

The optical power adjustment unit 22 performs optical power amplification and/or attenuation on at least one communication optical wave 24 of the at least two communication optical waves 24 according to the power control instruction.

Optionally, the power change information is used to indicate an overall change degree of at least two optical powers of the at least two transmitted detection optical waves 25. Power change information of the first detection optical wave may represent a power change status of the communication optical wave 24 belonging to a short band, and power change information of the second detection optical wave may represent a power change status of the communication optical wave 24 belonging to a long band.

Optionally, the power control instruction carriers an adjustment coefficient, and the adjustment coefficient includes an amplification coefficient and/or an attenuation coefficient corresponding to the at least one communication optical wave 24.

In conclusion, in this embodiment, the at least two communication optical waves are sent to the fiber channel by using the multiplexing unit, and the at least two out-of-band detection optical waves are simultaneously transmitted through the fiber channel, so that the optical transmission system can generate the power control instruction according to the power change information between the at least two detection optical waves, and then perform optical power amplification and/or attenuation on at least one communication optical wave in the at least two communication optical waves according to the obtained power control instruction. An optical power may change after the communication optical wave is transmitted due to two reasons. A first possible cause of the optical power change is that the SRS effect affects the optical power when the at least two communication optical waves are normally transmitted (there is no wave drop or wave addition in transmission). A second possible cause of the optical power change is that the SRS effect changes when there is wave drop or wave addition in transmission of at least one communication optical wave in the at least two communication optical waves, and a changed SRS effect causes fluctuation of the optical power. For the optical power change resulted from the two possible causes, the optical transmission system can obtain the power change information by analyzing a power change degree between the at least two detection optical waves. The power change information not only can represent an overall change degree of at least two optical powers of the at least two transmitted detection optical waves, but also can indirectly reflect an overall change degree of at least two optical powers of the at least two transmitted communication optical waves. The optical power adjustment unit dynamically adjusts the optical power of the communication optical wave according to the power control instruction, in order to reduce or eliminate impact caused by the SRS effect on the optical power fluctuation, increase a transmission distance of the optical system, and improve stability of the entire optical transmission system.

It should be noted that there are two possible implementations for a transmission direction of the detection optical wave:

In a first possible implementation, when the transmission direction of the detection optical wave is the same as the transmission direction of the communication optical wave, the multiplexing unit 21 multiplexes the at least two communication optical waves from the communication wave transmit ends 26, and transmits the at least two communication optical waves to the demultiplexing unit 23; correspondingly, the demultiplexing unit 23 demultiplexes the received at least two communication optical waves and outputs the at least two communication optical waves to the communication wave receive ends 27, and the communication wave receive ends 27 receive the at least two communication optical waves. The multiplexing unit 21 further multiplexes the at least two detection optical waves from the detection wave transmit end, and transmits the at least two detection optical waves to the demultiplexing unit 23; correspondingly, the demultiplexing unit 23 further demultiplexes the received at least two detection optical waves and outputs the at least two detection optical waves to the detection wave receive end, and the detection wave receive end receives the at least two detection optical waves.

In a second possible implementation, the transmission direction of the detection optical wave is opposite to a transmission direction of the communication optical wave. The multiplexing unit 21 multiplexes the at least two communication optical waves from the communication wave transmit ends 26, and transmits the at least two communication optical waves to the demultiplexing unit 23; correspondingly, the demultiplexing unit 23 demultiplexes the received at least two communication optical waves and outputs the at least two communication optical waves to the communication wave receive ends 27, and the communication wave receive ends 27 receive the at least two communication optical waves. The demultiplexing unit 23 further multiplexes the at least two detection optical waves from the detection wave transmit end, and transmits the at least two detection optical waves to the multiplexing unit 21; correspondingly, the multiplexing unit 21 further demultiplexes the received at least two detection optical waves and outputs the at least two detection optical waves to the detection wave receive end, and the detection wave receive end receives the at least two detection optical waves.

In the following, the first possible implementation is described by using embodiments shown in FIG. 3 to FIG. 6, and the second possible implementation is described by using an embodiment shown in FIG. 7.

Figure 3:
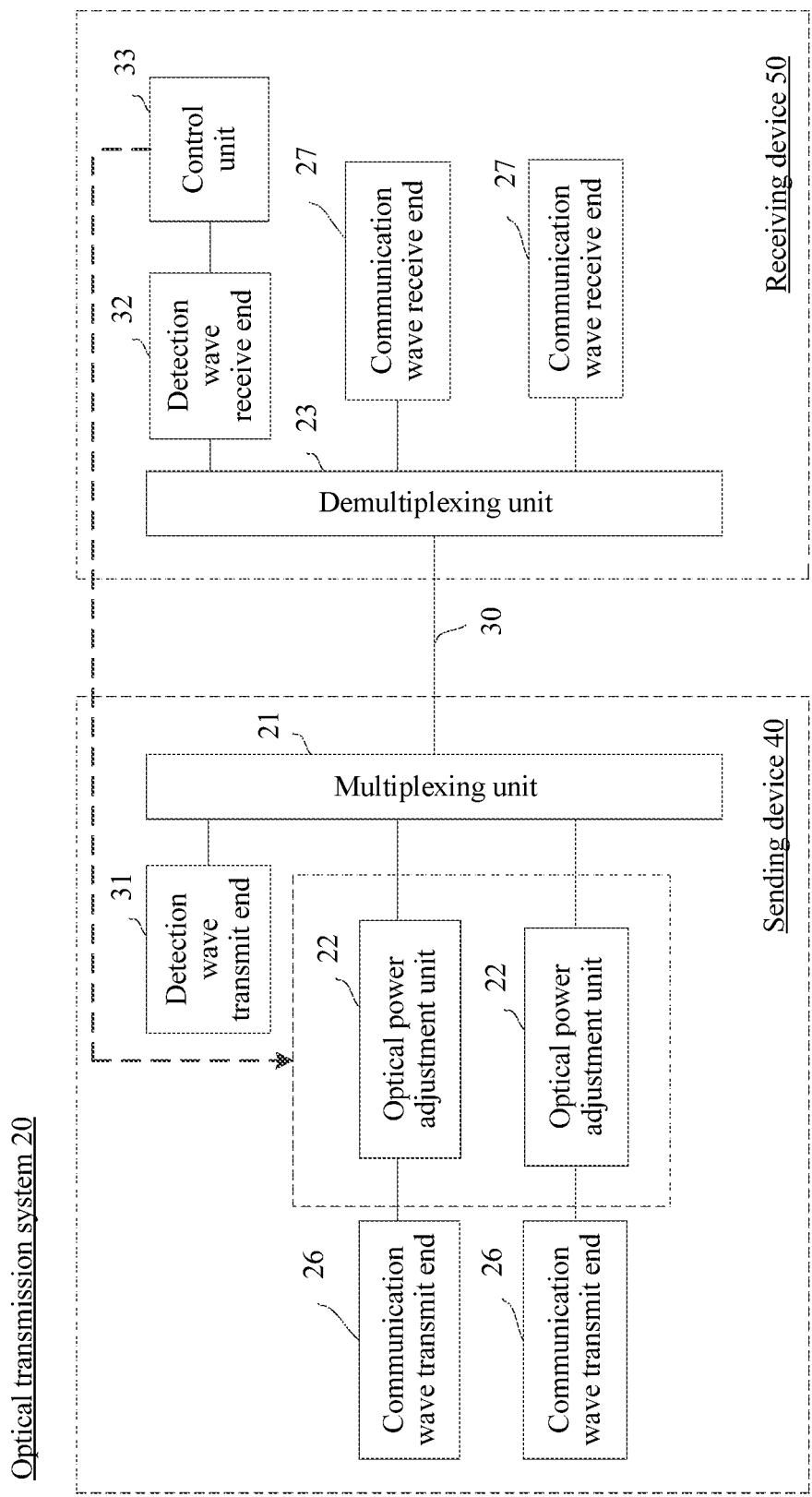
FIG. 3 is a schematic diagram of an optical transmission system according to another illustrative embodiment of this application.

Referring to FIG. 3, FIG. 3 is a schematic diagram of an optical transmission system according to another illustrative embodiment of this application. Based on the optical transmission system 20 provided in FIG. 2, the sending device 40 further includes: at least two detection wave transmit ends 31 connected to the multiplexing unit 21. The receiving device 50 further includes: at least two detection wave receive ends 32 connected to the demultiplexing unit 23, and a control unit 33 connected to the detection wave receive ends, and the control unit 33 is further connected to the optical power adjustment unit 22.

When the detection wave transmit ends 31 send at least two detection optical waves to the multiplexing unit 21, the multiplexing unit 21 multiplexes the at least two detection optical waves and transmits the at least two detection optical waves to the demultiplexing unit 23. Correspondingly, the demultiplexing unit 23 demultiplexes and outputs the received at least two detection optical waves to the detection wave receive ends 32, and the detection wave receive ends 32 receive the at least two detection optical waves. In this case, the transmission direction of the detection optical wave is the same as the transmission direction of a communication optical wave.

Optionally, the multiplexing unit 21 includes n first interfaces and one second interface, the demultiplexing unit 23 includes n first interfaces and one second interface, and n is a positive integer.

For example, the detection wave transmit ends 31 include a transmit end R1 and a transmit end R2, and correspondingly, the detection wave receive ends 32 include a receive end T1 and a receive end T2. The transmit end R1 is connected to a first interface 1 in the multiplexing unit 21, the transmit end R2 is connected to a first interface 2 in the multiplexing unit 21, a first interface 1 in the demultiplexing unit 23 is connected to the receive end T1, and a first interface 2 in the demultiplexing unit 23 is connected to the receive end T2. The transmit end R1 inputs a detection optical wave X1 to the multiplexing unit 21 by using the first interface 1 in the multiplexing unit 21, and the transmit end R2 inputs a detection optical wave X2 to the multiplexing unit 21 by using the first interface 2 in the multiplexing unit 21. The multiplexing unit 21 combines (multiplexes) the detection optical wave X1 and the detection optical wave X2, and sends the detection optical wave X1 and the detection optical wave X2 to the demultiplexing unit 23 by using one second interface, and the demultiplexing unit 23 receives the two detection optical waves by using one second interface and performs demultiplexing. The receive end T1 receives a detection optical wave Y1 (that is, an optical wave formed after the detection optical wave X1 is transmitted) by using the first interface 1 of the demultiplexing unit 23, and the receive end T2 receives a detection optical wave Y2 (that is, an optical wave formed after the detection optical wave X2 is transmitted) by using the first interface 2 of the demultiplexing unit 23.

Optionally, the multiplexing unit 21 continuously sends the at least two detection optical waves to the demultiplexing unit 23, or sends the at least two detection optical waves to the demultiplexing unit 23 once during every predetermined time period.

After the detection wave receive ends 32 receive the at least two detection optical waves from the demultiplexing unit 23, the control unit 33 generates a power control instruction according to the power change information between the at least two detection optical waves, and sends the power control instruction to the optical power adjustment unit 22.

Optionally, the control unit 33 generates a power control instruction once during every predetermined time period; or the control unit 33 determines whether an absolute value of the power change information between the at least two detection optical waves is greater than a preset threshold, and if the absolute value is greater than the preset threshold, the control unit 33 generates the power control instruction.

Optionally, when there may be wave drop or wave addition in transmission of the at least two communication optical waves, the SRS effect may change, and the optical power may fluctuate as a result. Therefore, each time the control unit 33 receives the at least two detection optical waves, the control unit 33 determines the power change information corresponding to the change of the SRS effect that happens during this time, calculates a difference in power change information of two consecutive times, and determines whether an absolute value of the difference is greater than a preset fluctuation value. If the absolute value of the difference is greater than the preset fluctuation value, the control unit 33 generates the power control instruction.

The at least two detection optical waves include m detection optical waves, and m is a positive integer greater than 1.

For example, 160 communication optical waves sent by the multiplexing unit 21 include 80 communication optical waves of different wavelengths belonging to a C band and 80 communication optical waves of different wavelengths belonging to an L band. When the 80 communication optical waves in the C band are normally transmitted (that is, there is no wave drop or wave addition in transmission of any communication optical wave of the C band), and the 80 communication optical waves in the L band are normally transmitted (that is, there is no wave drop or wave addition in transmission of any communication optical wave of the L band), the control unit 33 determines that power change information in this case is "−0.4 dB".

For another example, when the 80 communication optical waves in the C band are normally transmitted, but 10 out of the 80 communication optical waves in the L band are dropped in transmission (that is, 70 communication optical waves in the L band remain after transmission), the control unit 33 determines that power change information in this case is "0.9 dB". For another example, when 10 out of the 80 communication optical waves in the C band are dropped in transmission (that is, 70 communication optical waves in the C band remain after transmission), but the 80 communication optical waves in the L band are normally transmitted, the control unit 33 determines that power change information in this case is "−1 dB".

Optionally, that the control unit 33 generates a power control instruction according to the power change information between the at least two detection optical waves includes but is not limited to the following steps.

1. The control unit 33 determines m power change values of m detection optical waves according to the received m detection optical waves, where each power change value is used to indicate an optical power change degree of a single detection optical wave transmitted through the fiber channel 30.

Optionally, m transmit powers of the m detection optical waves are preset, and the control unit 33 pre-stores the m transmit powers of the m detection optical waves. For each detection optical wave, when receiving the detection optical wave, the control unit 33 determines a receive power of the detection optical wave, and subtracts the transmit power from the receive power of the detection optical wave to obtain a power change value of the detection optical wave to determine the m power change values of the m detection optical waves.

For example, the value of m is 2, and the two detection optical waves include a first detection optical wave A1 and a second detection optical wave B1. When the control unit 33 receives the first detection optical wave A1 and the second detection optical wave B1, the control unit 33 determines that the receive power of the first detection optical wave A1 is "2 dB" and that the prestored transmit power of the first detection optical wave A1 is "1 dB", and subtracts the transmit power "1 dB" from the receive power "2 dB" of the first detection optical wave A1 to obtain a power change value "1 dB" of the first detection optical wave A1; the control unit 33 determines that the receive power of the second detection optical wave B1 is "1 dB" and a prestored transmit power of the second detection optical wave B1 is "1 dB", and subtracts the transmit power "3 dB" from the receive power "1 dB" of the second detection optical wave B1 to obtain a power change value "−2 dB" of the second detection optical wave B1.

2. The control unit 33 determines the power change information according to the m power change values, where the power change information is used to indicate an overall change degree of m optical powers of the m detection optical waves transmitted through the fiber channel 30.

Optionally, the control unit 33 calculates the m power change values by using a predetermined algorithm to obtain the power change information. The power change information is obtained by using direct summation or weighted summation of the m power change values. Operators in the predetermined algorithm include but are not limited to operations such as addition, subtraction, multiplication, and division.

For example, if the value of m is 2, the power change value of a first detection optical wave is "1 dB", and the power change value of a second detection optical wave is "−2 dB", the control unit 33 performs a direct summation on the two power change values to obtain the power change information, which is "−1 dB".

For another example, if the value of m is 3, the power change value of a first detection optical wave A1 is "1 dB", the power change value of a first detection optical wave A2 is "1.6 dB", and the power change value of a second detection optical wave B1 is "−2 dB", the control unit 33 performs a weighted summation on the three power change values according to a preset weight of each power change value. For example, a weight corresponding to the power change value of the first detection optical wave A1 is 0.4, a weight corresponding to the power change value of the first detection optical wave A2 is 0.6, and a weight corresponding to the power change value of the second detection optical wave B1 is 1. The power change information can be calculated as: "0.4*1+0.6*1.6+1*(−2)"=−0.64 dB.

For another example, if the value of m is 3, the power change value of one first detection optical wave is "1 dB", the power change value of another first detection optical wave is "1.6 dB", and the power change value of a second detection optical wave is "−2 dB", the control unit 33 first calculates an average value "1.3 dB" of the power change values "1 dB" and "1.6 dB" of the two first detection optical waves, and then performs summation on the average value "1.3 dB" and the power change value "−2 dB" of the second detection optical wave to obtain the power change information of "−0.7 dB". An algorithm formula of the predetermined algorithm is not limited in this embodiment.

3. The control unit 33 determines an adjustment coefficient corresponding to the power change information according to a preset correspondence, where the preset correspondence includes a correspondence between the power change information and the adjustment coefficient.

Optionally, the control unit 33 pre-stores a correspondence between the power change information and an adjustment coefficient, and the power change information is in a one-to-one correspondence with the adjustment coefficient. When the control unit 33 determines the power change information, the control unit 33 queries the adjustment coefficient corresponding to the power change information from the preset correspondence.

Optionally, the adjustment coefficient includes an amplification coefficient and/or an attenuation coefficient corresponding to at least one communication optical wave. For example, the amplification coefficient is usually a coefficient greater than 1. For example, an amplification coefficient "1.22" corresponding to a communication optical wave is used to indicate that an optical power of the communication optical wave is amplified to 1.22 times. The attenuation coefficient is usually a coefficient greater than 0 and less than 1. For example, an attenuation coefficient "0.85" corresponding to a communication optical wave is used to indicate that an optical power of this communication optical wave is attenuated to 0.85 times.

Optionally, six communication optical waves sent by the multiplexing unit 21 belong to two different operating bands (the C band and the L band), the control unit 33 queries an adjustment coefficient corresponding to the power change information from the preset correspondence, and the adjustment coefficient includes one adjustment coefficient (one adjustment coefficient corresponding to all communication optical waves), or two adjustment coefficients (one adjustment coefficient corresponding to the C band and one adjustment coefficient corresponding to the L band), or six adjustment coefficients (six adjustment coefficients respectively corresponding to the six communication optical waves).

For example, as shown in Table 1, 160 communication optical waves sent by the multiplexing unit 21 include 80 communication optical waves of different wavelengths belonging to the C band and 80 communication optical waves of different wavelengths belonging to the L band, and the control unit 33 pre-stores a correspondence between the power change information and an adjustment coefficient of the C band and a correspondence between the power change information and an adjustment coefficient of the L band. When the control unit 33 determines the power change information to be "−1 dB", the control unit 33 queries the table below, and determines that an adjustment coefficient of the C band corresponding to "−1 dB" is "S61", and an adjustment coefficient of the L band corresponding to "−1 dB" is "S62".

TABLE 1

| Power change information | Adjustment coefficient of the C band | Adjustment coefficient of the L band |
| --- | --- | --- |
| 0.2 dB | S11 | S12 |
| 0.3 dB | S21 | S22 |
| 0.9 dB | S31 | S32 |
| −0.2 dB | S41 | S42 |
| −0.4 dB | S51 | S52 |
| −1 dB | S61 | S62 |

Optionally, the control unit 33 inputs the power gain information to a preset simulation function, and determines an output value of the simulation function as an adjustment coefficient. The simulation function is a function that emulates a correspondence between the power change information and an adjustment coefficient.

For example, if the adjustment coefficient includes one adjustment coefficient, and the control unit 33 inputs power gain information "−1 dB" into the preset simulation function, and obtains an output value "S62" of the simulation function, the control unit 33 then determines that the adjustment coefficient is "S62".

For another example, if the adjustment coefficient includes two adjustment coefficients, and the control unit 33 inputs power gain information "−1 dB" into the preset simulation function, and obtains two output values "S61" and "S62" of the simulation function, the control unit 33 then determines that the adjustment coefficients are "S61" and "S62".

For another example, if the adjustment coefficient includes two adjustment coefficients, and the control unit 33 inputs power gain information "−1 dB" into two preset simulation functions (a simulation function H1 corresponding to the C band and a simulation function H2 corresponding to the L band), and obtains an output value "S61" of the simulation function H1 and an output value "S62" of the simulation function H2, the control unit 33 then determines that an adjustment coefficient of the C band is "S61", and an adjustment coefficient of the L band is "S62". The manner in which the adjustment coefficient is determined is not limited to the embodiments described herein.

4. The control unit 33 generates the power control instruction carrying the adjustment coefficient.

When the control unit 33 sends the power control instruction carrying the adjustment coefficient to the optical power adjustment unit 22, the optical power adjustment unit 22 receives the power control instruction, and performs optical power amplification and/or attenuation on at least one communication optical wave in the at least two communication optical waves according to the power control instruction.

Optionally, the optical power adjustment unit 22 includes: at least two groups of a power amplifier and a power attenuator that are cascaded. The power amplifier is configured to amplify an optical power of at least one communication optical wave in the at least two communication optical waves according to the power control instruction, and the power attenuator is configured to attenuate an optical power of at least one communication optical wave in the at least two communication optical waves according to the power control instruction.

Figure 4:
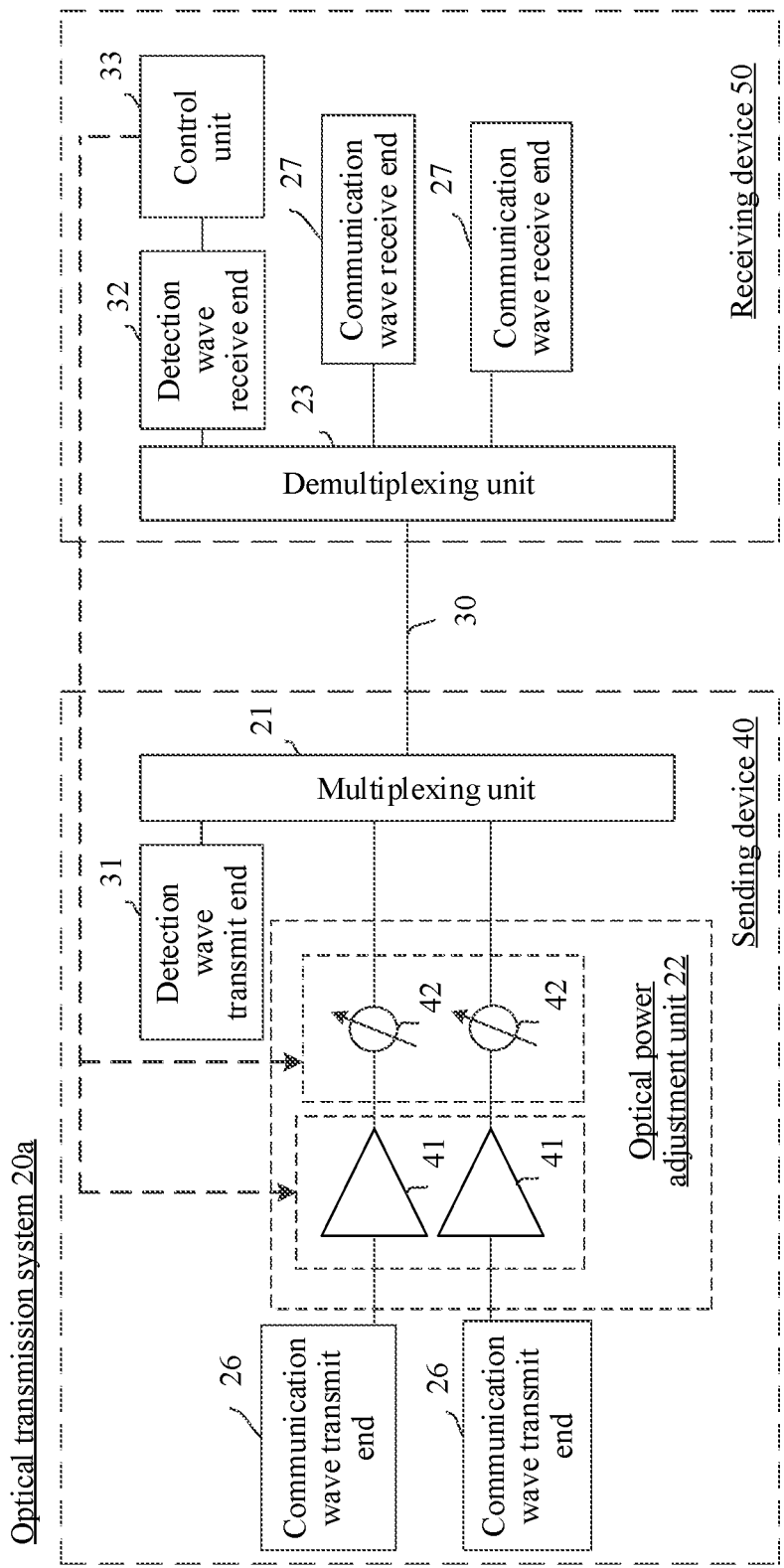
FIG. 4 is a schematic diagram of an optical transmission system according to another illustrative embodiment of this application.
Figure 5:
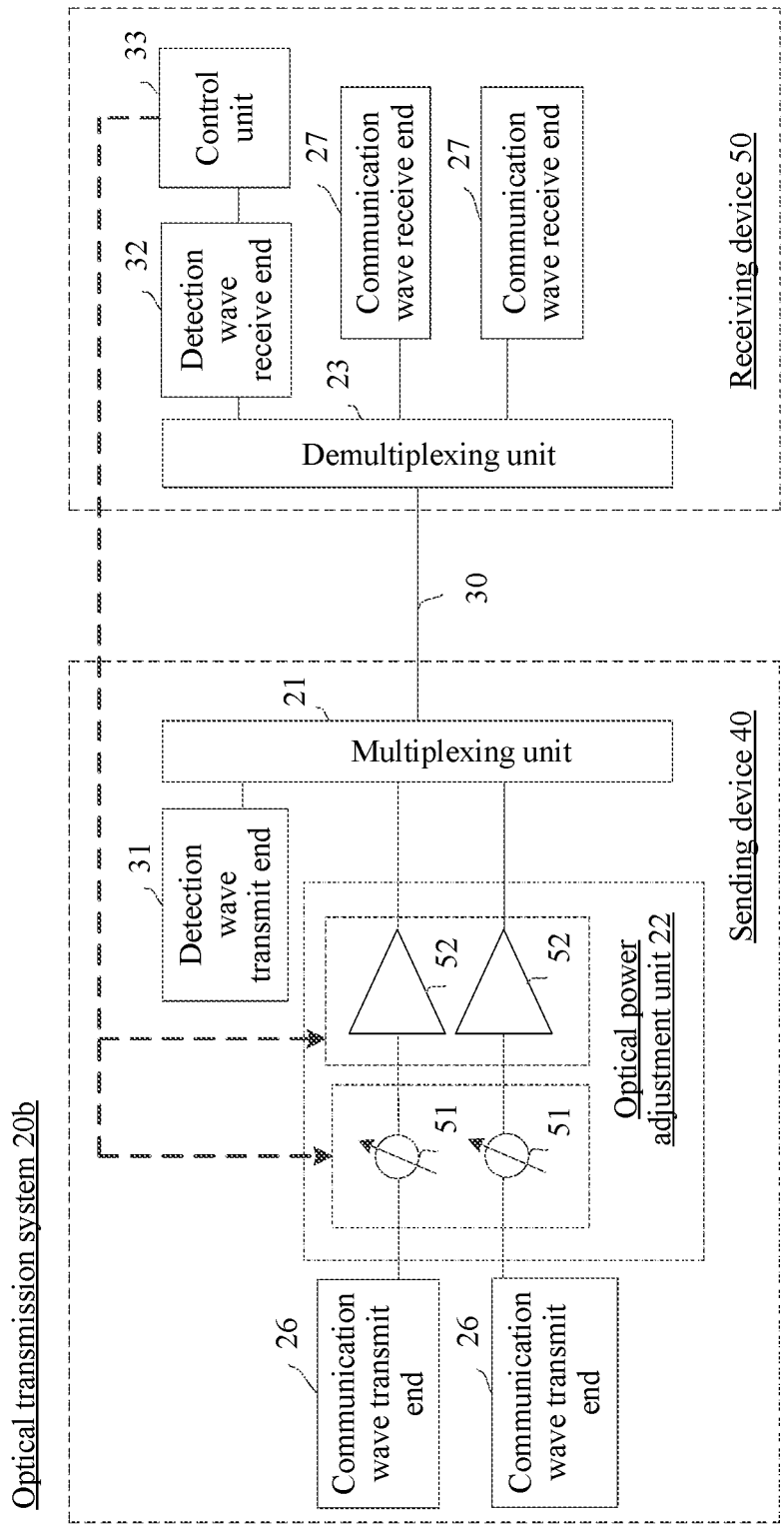
FIG. 5 is a schematic diagram of an optical transmission system according to another illustrative embodiment of this application.
Figure 6:
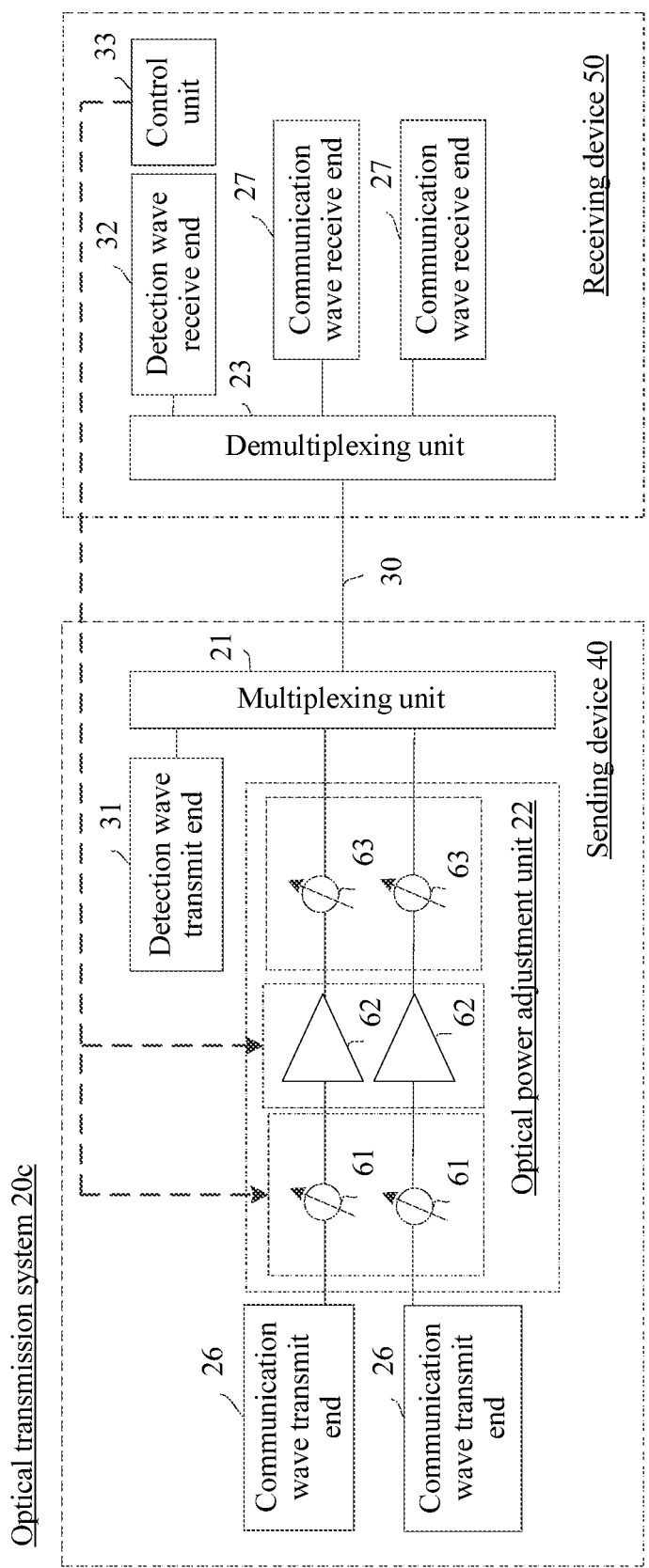
FIG. 6 is a schematic diagram of an optical transmission system according to another illustrative embodiment of this application.

Optionally, the connection relationship between each group of a power amplifier and a power attenuator includes, but is not limited to, the following three connection relationships. An optical transmission system 20a shown in FIG. 4 is used below to describe a first possible connection relationship. An optical transmission system 20b shown in FIG. 5 is used below to describe a second possible connection relationship. An optical transmission system 20c shown in FIG. 6 is used below to describe a third possible connection relationship.

As shown in FIG. 4, there are a power amplifier 41 and a power attenuator 42. An input end of the power amplifier 41 is configured to input at least one first communication optical wave; an output end of the power amplifier 41 is connected to an input end of the power attenuator 42; and an output end of the power attenuator 42 is connected to an input end of the multiplexing unit 21.

Optionally, if the first communication optical wave belongs to the C band, the power amplifier 41 is a C_EDFA, and the power attenuator 42 is a first VOA; if the first communication optical wave belongs to the L band, the power amplifier 41 is an L_EDFA, and the power attenuator 42 is a second VOA. Optionally, the power control instruction includes one or more power control instructions, and each power amplifier or each power attenuator corresponds to a respective power control instruction. When there are x power control instructions, the control unit 33 sends each power control instruction to a power amplifier or a power attenuator corresponding to this power control instruction, where x is a positive integer. Correspondingly, each power amplifier or each power attenuator adjusts an optical power according to a power control instruction sent to the power amplifier or the power attenuator.

For example, if the power control instruction includes one power control instruction, and the first communication optical wave belongs to the C band, the control unit 33 sends a power control instruction carrying an adjustment coefficient "1.35" to the C_EDFA, and the C_EDFA amplifies an optical power of the first communication optical wave to 1.35 times according to the received power control instruction.

For another example, if the power control instruction includes two power control instructions (a power control instruction 1 and a power control instruction 2), and the first communication optical wave belongs to the C band, the control unit 33 sends the power control instruction 1 carrying an adjustment coefficient "1.35" to the C_EDFA and sends the power control instruction 2 carrying an adjustment coefficient "0.86" to the first VOA. The optical power adjustment unit 22 first amplifies an optical power of the first communication optical wave to 1.35 times by using the C_EDFA, and then attenuates the optical power of the first communication optical wave to 0.86 times by using the first VOA.

As shown in FIG. 5, there are a power attenuator 51 and a power amplifier 52. An input end of the power attenuator 51 is configured to input at least one second communication optical wave; an output end of the power attenuator 51 is connected to an input end of the power amplifier 52; and an output end of the power amplifier 52 is connected to an input end of the multiplexing unit 21.

Optionally, if the second communication optical wave belongs to the C band, the power attenuator 51 is a first VOA, and the power amplifier 52 is a C_EDFA; if the second communication optical wave belongs to the L band, the power attenuator 51 is a second VOA, and the power amplifier 52 is an L_EDFA.

For related details, refer to the embodiment provided in FIG. 4. Details are not described herein.

As shown in FIG. 6, a group of a power amplifier and a power attenuator that are cascaded includes: a first power attenuator 61 and a second power attenuator 63. An input end of the first power attenuator 61 is configured to input at least one third communication optical wave; an output end of the first power attenuator 61 is connected to an input end of a power amplifier 62; an output end of the power amplifier 62 is connected to an input end of the second power attenuator 63; and an output end of the second power attenuator 63 is connected to an input end of the multiplexing unit 21.

Optionally, if the third communication optical wave belongs to the C band, the first power attenuator 61 is a first VOA, the power amplifier 62 is a C_EDFA, the second power attenuator 63 is a second VOA. If the third communication optical wave belongs to the L band, the first power attenuator 61 is a third VOA, the power amplifier 62 is an L_EDFA, and the second power attenuator 63 is a fourth VOA.

For related details, refer to the embodiment provided in FIG. 4. Details are not described herein.

In conclusion, in this embodiment, at least two communication optical waves belong to an operating band, and the at least two detection optical waves include at least one first detection optical wave whose wavelength is less than a minimum wavelength of the operating band, and at least one second detection optical wave whose wavelength is greater than a maximum wavelength of the operating band, so that a detection optical wave is out of the operating band (out of band) and a communication optical wave can be normally transmitted.

In this embodiment, the control unit further determines the m power change values of the m detection optical waves according to the received m detection optical waves, determines the power change information according to the m power change values, determines the adjustment coefficient corresponding to the power change information according to the preset correspondence, and generates the power control instruction carrying the adjustment coefficient. The control unit also determines the adjustment coefficient corresponding to the power change information according to the preset correspondence, for example, obtaining the adjustment coefficient by looking up a table or through calculation by using a simulation formula, so that the optical transmission system can accurately and dynamically adjust the optical power by using a "feedback→control" mechanism.

Figure 7:
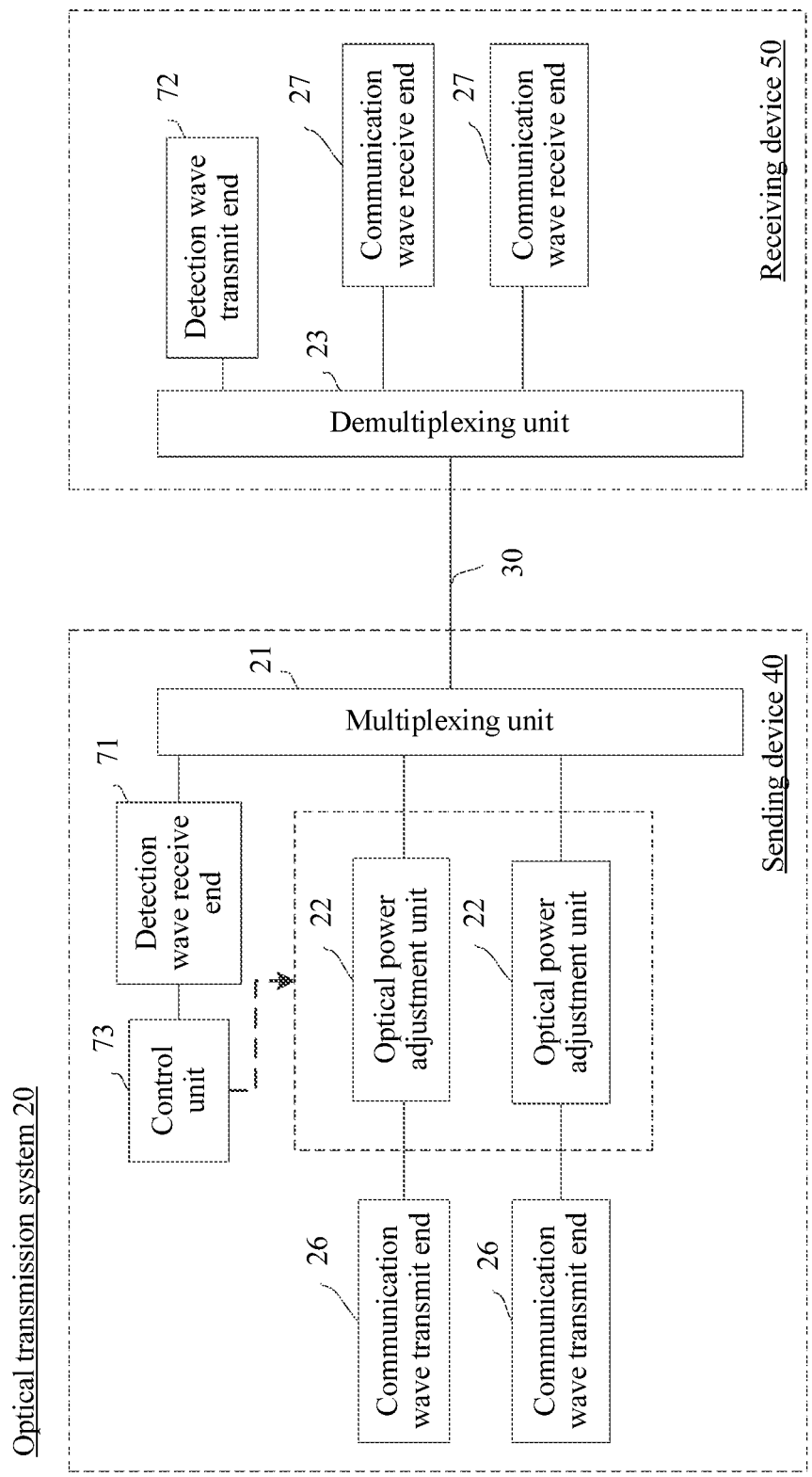
FIG. 7 is a schematic diagram of an optical transmission system according to another illustrative embodiment of this application.

Referring to FIG. 7, FIG. 7 is a schematic diagram of an optical transmission system according to another illustrative embodiment of this application. Based on the optical transmission system 20 provided in FIG. 2, the sending device 40 further includes: a detection wave receive end 71 connected to the multiplexing unit 21, and a control unit 73 connected to the detection wave receive end 71; and the receiving device 50 further includes a detection wave transmit end 72 connected to the demultiplexing unit 23.

When the detection wave transmit end 72 sends at least two detection optical waves to the demultiplexing unit 23, the demultiplexing unit 23 multiplexes the at least two detection optical waves and transmits the at least two detection optical waves to the multiplexing unit 21. Correspondingly, the multiplexing unit 21 demultiplexes and outputs the received at least two detection optical waves to the detection wave receive end 71, and the detection wave receive end 71 receives the at least two detection optical waves. In this case, the transmission direction of the detection optical wave is opposite to the transmission direction of a communication optical wave. After the detection wave receive end 71 receives the at least two detection optical waves, the control unit 73 generates a power control instruction according to the power change information between the at least two detection optical waves.

The optical power adjustment unit 22 receives the power control instruction from the control unit 73, and performs optical power amplification and/or attenuation on at least one communication optical wave of at least two communication optical waves according to the power control instruction.

Optionally, the quantity of first detection optical waves is equal to the quantity of second detection optical waves.

For related details, refer to the embodiment provided in FIG. 2 or FIG. 3. Details are not described herein.

Optionally, the optical power adjustment unit 22 includes at least two groups of a power amplifier and a power attenuator that are cascaded. A connection relationship of each group of a power amplifier and a power attenuator includes but is not limited to three possible connection relationships. For related details, refer to the embodiments provided in FIG. 4 to FIG. 6. Details are not described herein.

Figure 8:
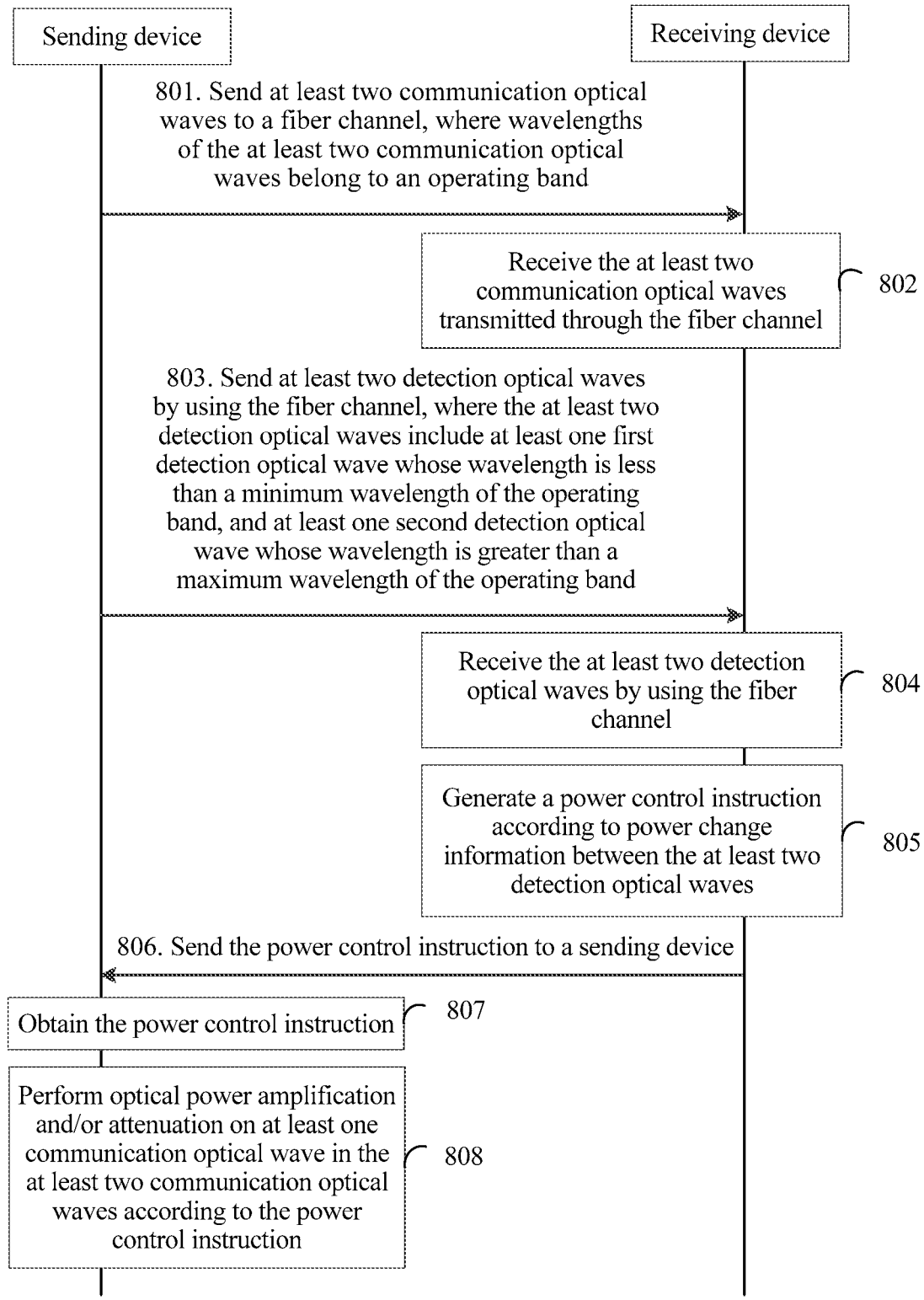
FIG. 8 is a flowchart of an optical power control method according to an illustrative embodiment of this application.

Referring to FIG. 8, FIG. 8 is a flowchart of an optical power control method according to an illustrative embodiment of this application. The optical power control method is used in the optical transmission system provided in any of the embodiments in FIG. 2 to FIG. 6. The method includes the following steps.

Step 801: A sending device sends at least two communication optical waves to a fiber channel, where the wavelengths of the at least two communication optical waves belong to an operating band.

Step 802: A receiving device receives the at least two communication optical waves transmitted through the fiber channel.

Step 803: The sending device sends at least two detection optical waves through the fiber channel, where the at least two detection optical waves include at least one first detection optical wave whose wavelength is less than a minimum wavelength of the operating band, and at least one second detection optical wave whose wavelength is greater than a maximum wavelength of the operating band.

Optionally, the quantity of first detection optical waves is equal to the quantity of second detection optical waves.

Step 804: The receiving device receives the at least two detection optical waves through the fiber channel.

Optionally, when the transmission direction of the detection optical wave is the same as the transmission direction of the communication optical wave, after receiving the at least two detection optical waves sent by the sending device, the receiving device generates a power control instruction according to the power change information between the at least two detection optical waves, and sends the power control instruction to the sending device.

Optionally, the at least two detection optical waves include m detection optical waves, and m is a positive integer greater than 1. The receiving device determines m power change values of the m detection optical waves according to the received m detection optical waves, and each power change value is used to indicate an optical power change degree of a single detection optical wave transmitted through the fiber channel. The receiving device determines the power change information according to the m power change values, and the power change information is used to indicate an overall change degree of m optical powers of the m detection optical waves transmitted through the fiber channel. The receiving device determines an adjustment coefficient corresponding to the power change information according to a preset correspondence, the preset correspondence includes a correspondence between the power change information and the adjustment coefficient, and the adjustment coefficient includes an amplification coefficient and/or an attenuation coefficient corresponding to the at least one communication optical wave. The receiving device then generates the power control instruction carrying the adjustment coefficient.

Step 805: The receiving device generates a power control instruction according to the power change information between the at least two detection optical waves.

Step 806: The receiving device sends the power control instruction to the sending device.

Step 807: The sending device obtains the power control instruction.

Step 808: The sending device performs optical power amplification and/or attenuation on at least one communication optical wave in the at least two communication optical waves according to the power control instruction.

For related details, refer to the embodiments provided in FIG. 2 to FIG. 6. Details are not described herein.

Figure 9:
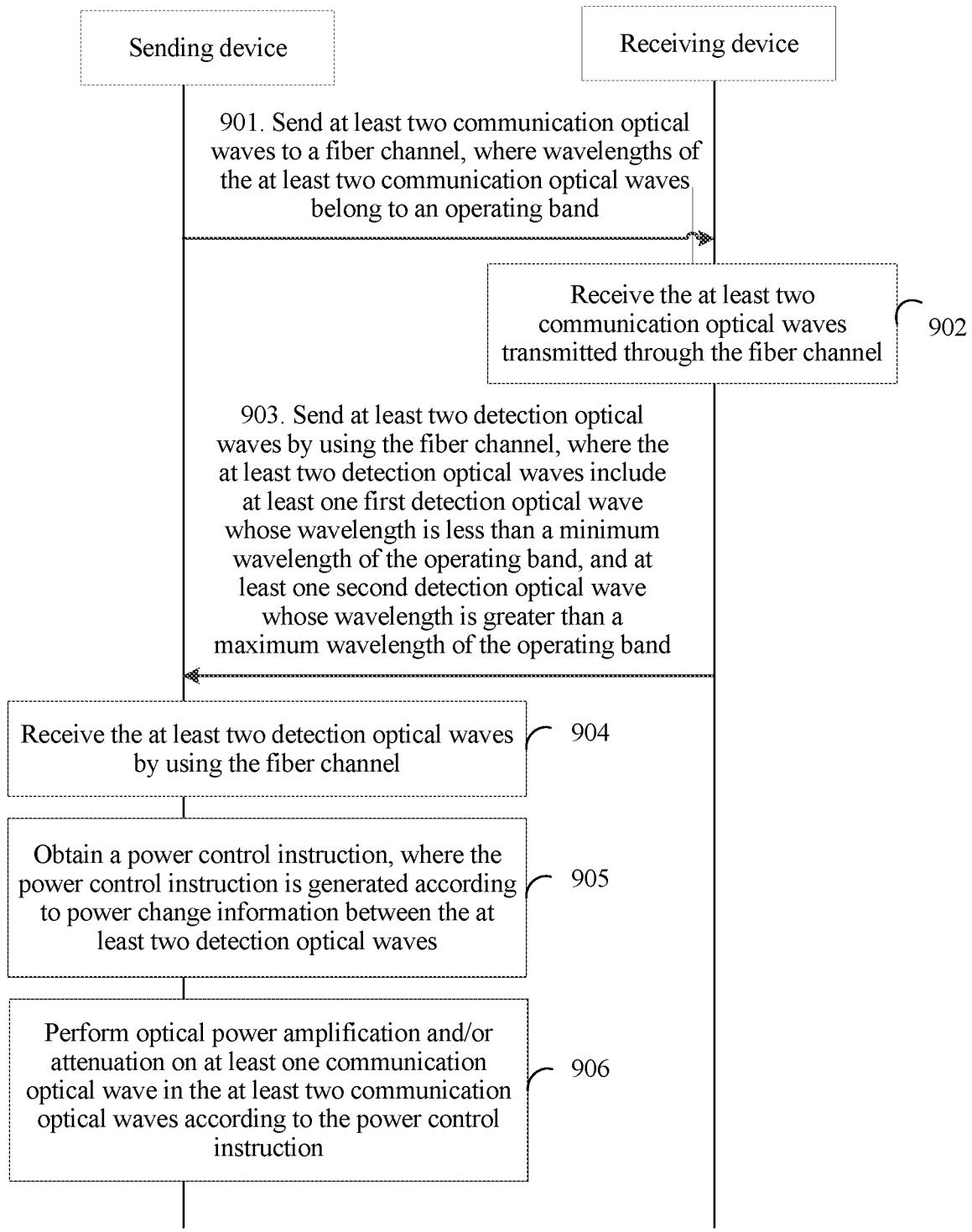
FIG. 9 is a flowchart of an optical power control method according to an illustrative embodiment of this application.

Referring to FIG. 9, FIG. 9 is a flowchart of an optical power control method according to an illustrative embodiment of this application. The optical power control method is used in the optical transmission system provided in FIG. 7. The method includes the following steps.

Step 901: A sending device sends at least two communication optical waves to a fiber channel, where the wavelengths of the at least two communication optical waves belong to an operating band.

Step 902: A receiving device receives the at least two communication optical waves transmitted through the fiber channel.

Step 903: The receiving device sends at least two detection optical waves through the fiber channel, where the at least two detection optical waves include at least one first detection optical wave whose wavelength is less than a minimum wavelength of the operating band, and at least one second detection optical wave whose wavelength is greater than a maximum wavelength of the operating band.

Optionally, the quantity of first detection optical waves is equal to the quantity of second detection optical waves.

Step 904: The sending device receives the at least two detection optical waves through the fiber channel.

Step 905: The sending device obtains a power control instruction, where the power control instruction is generated according to the power change information between the at least two detection optical waves.

Step 906: The sending device performs optical power amplification and/or attenuation on at least one communication optical wave in the at least two communication optical waves according to the power control instruction.

Optionally, when the transmission direction of the detection optical wave is opposite to the transmission direction of the communication optical wave, after the receiving device sends the at least two detection optical waves to the sending device, the sending device generates the power control instruction according to the power change information between the at least two detection optical waves, and performs optical power amplification and/or attenuation on at least one communication optical wave in the at least two communication optical waves according to the power control instruction.

For related details, refer to the embodiment provided in FIG. 7. Details are not described herein.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc. The storage medium may be non-transitory.

In the embodiments of the present invention, the terms "first", "second", "third", and so on (if existent) are intended to distinguish between similar objects but do not necessarily indicate a specific order or sequence. It should be understood that the objects termed in such a way are interchangeable in proper circumstances so that the embodiments of the present invention can be implemented in other embodiments in other orders other than the embodiments illustrated or described in the specification.

The foregoing descriptions are merely examples of embodiments of this application, but are not intended to limit this application. Any modification, equivalent replacement, or improvement made without departing from the spirit and principle of this application should fall within the protection scope of this application.

What is claimed is:

1. A sending device comprising:
a multiplexing unit; and
an optical power adjustment unit;
wherein the multiplexing unit is configured to send at least two communication optical waves to a fiber channel, wherein wavelengths of the at least two communication optical waves belong to an operating band;
wherein the multiplexing unit is further configured to send or receive at least two detection optical waves through the fiber channel, wherein the at least two detection optical waves comprise at least one first detection optical wave whose wavelength is less than a minimum wavelength of the operating band, and at least one second detection optical wave whose wavelength is greater than a maximum wavelength of the operating band; and
wherein the optical power adjustment unit is configured to: obtain a power control instruction, wherein the power control instruction is generated according to power change information between the at least two detection optical waves; and perform optical power amplification and/or attenuation on at least one communication optical wave in the at least two communication optical waves according to the power control instruction.

2. The sending device according to claim 1, wherein the sending device further comprises a detection wave transmit end connected to the multiplexing unit;
wherein the detection wave transmit end is configured to input the at least two detection optical waves to the multiplexing unit, wherein a transmission direction of the detection optical wave is the same as a transmission direction of the communication optical wave; and
wherein the optical power adjustment unit is configured to receive the power control instruction that is generated based on the power change information between the at least two detection optical waves.

3. The sending device according to claim 1, wherein the sending device further comprises: a detection wave receive end connected to the multiplexing unit, and a control unit connected to the detection wave receive end;
wherein the detection wave receive end is configured to receive the at least two detection optical waves from the multiplexing unit, wherein a transmission direction of the detection optical wave is opposite to a transmission direction of the communication optical wave;
wherein the control unit is configured to: after the detection wave receive end receives the at least two detection optical waves, generate the power control instruction according to the power change information between the at least two detection optical waves; and
wherein the optical power adjustment unit is configured to receive the power control instruction from the control unit.

4. The sending device according to claim 3, wherein the at least two detection optical waves comprise m detection optical waves, and m is a positive integer greater than 1; and the control unit is configured to:
determine m power change values of the m detection optical waves according to the received m detection optical waves, wherein each power change value is used to indicate an optical power change degree of a single transmitted detection optical wave;
determine the power change information according to the m power change values, wherein the power change information is used to indicate an overall change degree of m optical powers of the m transmitted detection optical waves;
determine an adjustment coefficient corresponding to the power change information according to a preset correspondence, wherein the preset correspondence comprises a correspondence between the power change information and the adjustment coefficient, and the adjustment coefficient comprises an amplification coefficient and/or an attenuation coefficient corresponding to the at least one communication optical wave; and
generate the power control instruction carrying the adjustment coefficient.

5. The sending device according to claim 1, wherein a quantity of first detection optical waves is equal to a quantity of second detection optical waves.

6. An optical power control method, comprising:
sending at least two communication optical waves to a fiber channel, wherein wavelengths of the at least two communication optical waves belong to an operating band;
sending or receiving at least two detection optical waves through the fiber channel, wherein the at least two detection optical waves comprise at least one first detection optical wave whose wavelength is less than a minimum wavelength of the operating band, and at least one second detection optical wave whose wavelength is greater than a maximum wavelength of the operating band;
obtaining a power control instruction, wherein the power control instruction is generated according to power change information between the at least two detection optical waves; and
performing optical power amplification and/or attenuation on at least one communication optical wave in the at least two communication optical waves according to the power control instruction.

7. The method according to claim 6, wherein a transmission direction of the detection optical wave is the same as a transmission direction of the communication optical wave, and the obtaining of a power control instruction comprises:
after sending the at least two detection optical waves to a receiving device, receiving the power control instruction from the receiving device, wherein the power control instruction is based on the power change information between the at least two detection optical waves.

8. The method according to claim 6, wherein a transmission direction of the detection optical wave is opposite to a transmission direction of the communication optical wave, and the obtaining of a power control instruction comprises:
after receiving the at least two detection optical waves sent by a receiving device, generating the power control instruction according to the power change information between the at least two detection optical waves.

9. The method according to claim 8, wherein the at least two detection optical waves comprise m detection optical waves, and m is a positive integer greater than 1; and wherein, before the generating of the power control instruction according to the power change information between the at least two detection optical waves, the method further comprises:
determining m power change values of the m detection optical waves according to the received m detection optical waves, wherein each power change value is used to indicate an optical power change degree of a single detection optical wave transmitted through the fiber channel; and determining the power change information according to the m power change values, wherein the power change information is used to indicate an overall change degree of m optical powers of the m detection optical waves transmitted through the fiber channel; and the generating of the power control instruction according to the power change information between the at least two detection optical waves comprises:

determining an adjustment coefficient corresponding to the power change information according to a preset correspondence, wherein the preset correspondence comprises a correspondence between the power change information and the adjustment coefficient, and the adjustment coefficient comprises an amplification coefficient and/or an attenuation coefficient corresponding to the at least one communication optical wave; and generating the power control instruction carrying the adjustment coefficient.

10. The method according to claim 6, wherein a quantity of first detection optical waves is equal to a quantity of second detection optical waves.

* * * * *